United States Patent Office 3,764,300
Patented Oct. 9, 1973

3,764,300
METHOD OF OPERATING A BLAST FURNACE BY BLOWING VARIABLE GASEOUS AUXILIARY REDUCTION MEDIUM
Werner Wenzel and Leon Chaussy, Aachen, Germany, assignors to Nippon Kokan Kabushiki Kaisha
No Drawing. Filed July 21, 1971, Ser. No. 164,836
Claims priority, application Germany, July 25, 1970, P 20 26 845.3
Int. Cl. C21b 5/00
U.S. Cl. 75—42
6 Claims

ABSTRACT OF THE DISCLOSURE

In operating a blast furnace, a gaseous auxiliary reduction medium is blown into the blast furnace at a level above the blast tuyeres and substantially above the zone in which the burden melts down and blast-air is also blown in through the tuyeres. Different quantity of gas and blast-air is supplied to adjacent blast nozzles for the reducing gas and those for the blast-air respectively, the gas supply to each nozzle for reducing gas and to each blast-air nozzle being alternated periodically between a maximum quantity and a minimum quantity. The superposed or subjacent blast nozzles for the reducing gas and blast-air are supplied in such manner that the blast cycles are reciprocal. The quantities of reducing gas and blast-air blown into the blast furnace through the nozzles are interrelated to provide that the total quantity of reducing gas blown into the blast furnace and that of blast-air remain substantially equal and correspond to an optimum flow of gas through the stack of the blast furnace.

---

This invention relates to the operation of blast furnaces.

In the conventional operation of blast furnaces, with or without an auxiliary fuel feed through the blast tuyeres, the extent of indirect reduction is limited by the fact that the material balance is closely tied up with the energy balance.

By the present invention it is possible to obtain an increase in indirect reduction by separately controlling the upper furnace and the lower furnace.

According to the present invention there is provided a method of operating a blast furnace including blowing into the furnace a gaseous auxiliary reduction medium at a level above the blast tuyeres and substantially above the zone in which the burden melts down and also blowing blast-air through the blast tuyeres and comprising:

(a) Supplying adjacent blast nozzles for the reducing gas and adjacent blast nozzles for the blast-air with different quantities of gas and blast-air respectively;

(b) Periodically alternating the gas supply to each nozzle for reducing gas and to each blast-air nozzle between a maximum quantity and a minimum quantity;

(c) Supplying the superposed or subjacent blast nozzles for the reducing gas and blast-air in such manner that the blast cycles are reciprocal, i.e. the blast nozzle for the gas reaches its maximum when the blast nozzle for the blast-air is at its minimum, and vice versa;

(d) Interrelating the quantities of reducing gas and blast-air introduced into the blast furnace through the individual nozzles to provide that the total quantity of reducing gas introduced into the blast furnace and the total quantity of blast-air remain substantially equal and correspond to an optimum flow of gas through the stack of the blast-furnace.

Thus, in one form of the invention, an auxiliary reduction gas having a temperature of approximately 1000° C. is supplied to the upper furnace at a distance of roughly 4 to 5 metres above the tuyere level. This gas mixes with the $CO+N_2$, that passes out of the lower furnace, and reduces the iron ores in the temperature range of 1000 to 800° C., the extent of indirect reduction increasing roughly in proportion to the amount of stack gas (less the inert gas).

The residual oxygen from the iron ores and the oxygen from the foreign elements can be reduced in the lower furnace, this occurring by a process of direct reduction. as it is called. Furthermore, the necessary melting down of the charge is also carried out. The coke consumption is lowered by the following factors:

(a) Direct reduction below 10%, this economizing both in reduction coke and fuel coke;

(b) A smaller quantity of coke per ton of pig leads to a smaller quantity of slag;

(c) Heat losses are reduced.

The ideal consumption figure is 150 kg. of coke per metric ton of pig. An actual optimum of 200 kg. per metric ton of pig appears to be attainable.

The total supply of gaseous media (blast-air+reduction gas) fed to a furnace is constant with time. However, the supply of media to the individual tuyeres varies periodically between a minimum and a maximum, the cycles of 2 diametrically opposite tuyeres being offset to the extent of $\pi$. Additionally, the supply of the media is so regulated that the cycle of each tuyere is offset from the cycle of the adjacent tuyere to an extent of $\pm 2\pi/z$ ($z$=the number of tuyeres for blast-air and for gas). This method of control leads to a zone of maximum supply, which zone rotates about the vertical axis of the blast furnace.

The supply of media to two superposed tuyeres involves the use of cycles offset from each other to the extent of $\pi$, so that the flow of gas through the stack, i.e. the gas velocity above the level for reduction-gas feed, remains constant with time and position.

A plurality of tuyeres can also be brought together to form a group which operates on a cycle offset from that of the adjacent group to the extent of $2\pi/n$ ($n$=the number of groups of tuyeres). An extreme case would be the division into two groups of the total number of tuyeres in a distributing ring.

The quantities of reducing gas and blast-air supplied to individual nozzles are controlled by periodically varying the cross-section of the gas-flow passage of each individual nozzle between a minimum and a maximum by using conventional control means.

The distance between the two levels of tuyeres for the auxiliary reducing gas and those for the blast-air must be so great that the gases of combustion formed in front of the blast-air tuyeres will have passed their heat to the burden as completely as possible when the level at which the reducing gas is fed into the furnace is reached. Cooling of the gases from the lower furnace by mixing with colder reducing gases in order to achieve a mix temperature of 1000° C., is pyrotechnically disadvantageous, since then only part of the quantity of heat intended for the lower furnace is supplied thereto, and the efficiency of the fuel coke is thus considerably reduced.

The gas supplied in the stack must be such that on the one hand the exchange of heat between gas and burden is ensured (more than 1700 Nm.³/metric ton of pig), and on the other the required degree of indirect reduction is attained (amount of $CO+H_2$).

The frequency at which the maximum supply of gases over a rotating path occurs is determined by the point at which maximum capacity is reached.

The temperature curve for the blast furnace is characterized by an extended zone of indirect reduction (T=800 to 1000° C.). The temperature curve in the upper furnace can be controlled by the amount of the stack gases, i.e. the degree of indirect reduction does not depend solely upon the quantity of reducing gases, but also upon the nitrogen fraction.

Reduction of heat required in the lower furnace when it is being operated with a blast air temperature in excess of 1,000° C., may be effected by using blast air at a temperature below 1,000° C. admixed with oxygen-enriched blast air.

The auxiliary reducing gas can be obtained by the partial oxidation of carbon carriers with pure oxygen, or by regenerating part of the top gas with carbon carriers, regeneration being more advantageous since the top gas has a higher thermal value and the quantity of heat carried out of the blast furnace is not too great.

The advantages of this method over that of patent application Ser. No. 146,914, filed May 26, 1971, are as follows:

(a) The discontinuity of the blast furnace operation is replaced by an apparently continuous operation, since the entire supply of gas is constant with time, and only the distribution through the individual tuyeres varies locally. Capacity is thus increased.

(b) The blast-air heaters and regenerators are operated on a continuous basis.

(c) The disadvantages occurring when the maximum amount of blast-air is supplied, i.e. the simultaneous need for high melting capacity and favourable flow-off conditions in the molten burden, which is impossible because of the considerable pressure head on all sides in front of the blast-air tuyeres, are eliminated, since the molten material can always flow away at that side at which the intensity of gas-feed is at the minimum.

(d) Heat travels in the radial direction in the lower furnace from the area of maximum feed to the area of minimum feed.

Since, in regenerative top-gas operation, the top gas is used up completely by the process itself, one part being used for regeneration, another supplying the heat for regeneration, and the third supplying the heat for the blast-air heaters, the entire consumption can be reduced to approximately $3000.10^3$ kcal./metric ton of pig, and only one-half of this has to be provided by the coke.

We claim:

1. A method of operating a blast-furnace containing a plurality of peripherally spaced blast tuyeres for feeding blast air within a given range of values and a plurality of peripherally spaced auxiliary tuyeres for feeding an auxiliary reducing gas within a given range of values, said auxiliary tuyeres being positioned at a level above the blast tuyeres and substantially above the zone in which the burden melts down comprising (a) feeding at least two adjacent ones of said plurality of tuyeres and at least two adjacent ones of said plurality of blast tuyeres with different quantities of auxiliary reducing gas and blast-air respectively, said different quantities being between said respective ranges of values;

(b) periodically and cyclically varying (i) the feed to each of said plurality of auxiliary tuyeres with a cycle of variation from a maximum to a minimum and back to the maximum value, and (ii) the feed to each of said plurality of blast tuyeres with a cycle of variation from a maximum to a minimum value and back to the maximum value;

(c) said cyclical variation of the feed to said auxiliary tuyeres and said blast tuyeres positioned in any given vertical section of the furnace being offset by one-half cycle from each other such that in said given vertical section, when the gas feed is at a maximum value, the air feed is at a minimum value and vice versa;

(d) interrelating the quantities of auxiliary reducing gas and blast-air feed into the blast furnace through the said tuyeres such that the total quantity of auxiliary reducing gas introduced into the blast furnace from all of said auxiliary tuyeres and the total quantity of blast air from all of said blast tuyeres is substantially constant and corresponds to an optimum flow of gas through the stack of the blast furnace.

2. A method as claimed in claim 1, wherein a number of adjacent blast tuyeres which may not exceed one-half of the total of the blast tuyeres are combined to form a group which is supplied by a distributor ring duct with substantially equal quantities blast-air.

3. A method as claimed in claim 1 wherein a number of adjacent auxiliary reducing gas tuyeres which may not exceed one-half of the total of the auxiliary reducing gas tuyeres are combined to form a group which is supplied by a distributor ring duct with substantially equal quantities of reducing gas.

4. A method as claimed in claim 1, wherein there is a constant inlet pressure in the common reducing gas and blast-air supply ducts, the quantities of reducing gas and blast-air supplied to individual tuyeres being controlled by periodically varying the cross-section of the gas-flow passage of an individual tuyere between a minimum and a maximum.

5. A method as claimed in claim 1 wherein a number of adjacent blast tuyeres which may not exceed one-half of the total of the blast tuyeres are combined to form a group which is supplied by a distributor ring duct with substantially equal quantities of blast-air and a number of adjacent auxiliary reducing gas tuyeres which may not exceed one-half of the total of the auxiliary reducing gas tuyeres combined to form a group which is supplied by a distributor ring duct with substantially equal quantities of reducing gas and wherein there are at least two groups of such blast tuyeres and at least two groups of such auxiliary reducing gas tuyeres.

6. A method as claimed in claim 1 wherein said auxiliary tuyeres are divided into two equal groups of tuyeres, each of said groups being supplied reducing gas by respective distributor ring ducts, the tuyeres in each group being supplied with substantially equal quantities of reducing gas; wherein said blast tuyeres are divided into two equal blast-air groups of tuyeres, each of said blast-air groups being supplied blast-air by respective blast-air distributor ring ducts, the blast tuyeres in each blast-air group being supplied substantially equal quantities of blast-air; and wherein the quantity of gas and blast-air to respective tuyeres is controlled by the pressure in the distributor duct ring supplying said respective tuyeres.

References Cited

UNITED STATES PATENTS

| | | | |
|---|---|---|---|
| 1,491,113 | 4/1924 | Coffin | 75—42 |
| 3,193,271 | 7/1965 | Tsujihata et al. | 75—41 X |
| 1,738,577 | 12/1929 | Haven | 75—41 UX |
| 2,395,385 | 2/1946 | Green et al. | 75—42 X |
| 2,727,816 | 12/1955 | Raick | 75—41 X |
| 2,952,533 | 9/1960 | Cuscoleca et al. | 75—41 |
| 3,301,544 | 1/1967 | Eft et al. | 75—42 |

FOREIGN PATENTS

| | | | |
|---|---|---|---|
| 275,601 | 10/1928 | Great Britain | 75—41 |

L. DEWAYNE RUTLEDGE, Primary Examiner

M. J. ANDREWS, Assistant Examiner